United States Patent [19]
Neumann

[11] 3,865,664
[45] Feb. 11, 1975

[54] LAMINATED FOIL CANDY WRAPPER AND METHOD OF PREPARING

[75] Inventor: Robert G. Neumann, Bellbrook, Ohio

[73] Assignee: The Specialty Papers Co., Dayton, Ohio

[22] Filed: May 31, 1973

[21] Appl. No.: 365,452

[52] U.S. Cl.............. 156/192, 156/277, 156/278, 156/305, 53/40, 117/119.2, 117/158, 117/63, 117/65.2, 161/216, 161/220, 161/223, 161/235, 161/250, 161/406, 161/413
[51] Int. Cl............................................ B31c 13/00
[58] Field of Search ........... 156/278, 277, 184, 289, 156/192, 305; 161/220, 233, 235, 244, 270, 207, 413, 406; 117/119.2, 158, 65.2, 63

[56] References Cited
UNITED STATES PATENTS

| 3,098,780 | 7/1963 | Krause | 161/220 |
| 3,245,857 | 4/1966 | Rutledge | 156/281 |
| 3,476,700 | 11/1969 | Moyer | 117/158 |
| 3,488,252 | 1/1970 | Lamar | 161/220 |
| 3,522,081 | 7/1970 | Moyer | 117/119.2 |
| 3,553,074 | 1/1971 | Knepp | 161/220 |
| 3,716,441 | 2/1973 | Black et al. | 161/235 |
| 3,717,534 | 2/1973 | Duling et al. | 161/235 |

FOREIGN PATENTS OR APPLICATIONS

| 694,160 | 9/1964 | Canada | 117/119.2 |

Primary Examiner—George F. Lesmes
Assistant Examiner—Stanley S. Silverman
Attorney, Agent, or Firm—Biebel, French & Bugg

[57] ABSTRACT

A laminated foil candy wrapper is prepared by coating and impregnating a paper base with wax, bonding a thin metal foil layer to the base with an adhesive, printing on the non-adhered side of the foil, and applying a lacquer overcoat over the printing. The laminate is then dampened with an aqueous plasticizing solution and aged to establish a specified moisture level throughout the laminate. The full foil laminate is capable of withstanding the twisting performed by a candy wrapping machine, and has all the other properties required of a laminated candy wrapper.

8 Claims, 2 Drawing Figures

PATENTED FEB 1 1 1975　　　　　　　　　3,865,664

3,865,664

LAMINATED FOIL CANDY WRAPPER AND METHOD OF PREPARING

BACKGROUND OF THE INVENTION

The present invention relates to a laminated foil wrapper and more particularly to a full foil laminate capable of use in wrapping individual pieces of candy.

In the past, considerable difficulty has been encountered in providing a satisfactory candy wrapper for individual pieces of candies, such as "toffees." One primary consideration is that the wrapper must be able to withstand the twisting involved in the high-speed wrapping operation without tearing. It must also protect the freshness of the candy while at the same time not allowing the candy to stick to the inside of the wrapper.

One form of candy wrapper used commercially consists of a printed waxed paper base with one or more strips of printed unsupported metal foil laminated to the base. The purpose of the strip lamination is to leave the areas where the twist occurs free of foil. Accordingly, since there is no foil in these areas, there is no problem with the foil rupturing, delaminating and the paper tearing in the area of twisting and in the area at the corners of the candy. A method of preparing this type of laminated wrapper involves printing both the paper base and the foil separately, waxing the paper, slitting the unlaminated foil into strips, and laminating the strips to the waxed paper base layer.

Since this type of wrapper, with its laterally discontinuous foil lamina, is both difficult to produce and difficult to handle during the wrapping operations, it is desirable to use a full foil laminated candy wrapper.

A full foil laminated wrapper is more economical to produce. It also has an additional advantage in that it retains the moisture in the candy and keeps it fresh, whereas, with the strip lamination the moisture in the candy can more easily escape through the portions of the wrapper where there is no foil.

The difficulty with a full foil laminated candy wrapper is achieving the capability of satisfactory performance on a candy wrapping machine. In U.S. Pat. No. 3,553,074, for example, a laminate is disclosed which has a lubricant added to the laminating adhesive in order to improve the handling characteristics of the laminate during wrapping. When wound in coil form the lubricant migrates through the tissue and texturizes the surface of the adjacent foil layer to give it a satisfactory degree of slip as well as resistance to scuffing and tearing when forming, folding or creasing.

The problem remains, however, in providing a laminate with sufficient tear strength to withstand the twisting involved in wrapping individual pieces of candy. In addition, when the paper side of the wrapper is next to the candy, there is a problem of the candy sticking to the paper or the wax on the paper transferring to the candy. Until the present invention, there was no full foil laminated candy wrapper commercially available which overcame these difficulties.

SUMMARY OF THE INVENTION

In accordance with the present invention, there is provided a laminated wrapping material having all the desirable features of a full foil laminate and yet capable of use for wrapping individual pieces of candy. The laminate of the present invention has a dry-waxed paper base with a thin metal foil adhered to the paper base. The waxed paper base is such that, before laminating, one side is waxy and the other side is relatively wax-free. The metal foil is adhered to the wax-free side of the paper base. Indicia may be printed on the non-adhered side of the metal foil and a lacquer coating applied over the printing.

The laminate is also treated to establish a desired moisture level throughout the laminate by dampening with a specified amount of an aqueous plasticizing solution, such as a water silicone solution. The laminate is then wound into a roll, the roll is sealed in a plastic material, and the laminate aged for at least 8 hours, which establishes a moisture equilibrium throughout the laminate. These steps assure that there is sufficient moisture within the laminate to provide good twisting properties. In addition, the silicone provides good release properties to prevent the candy from sticking to the wrapper and to prevent the wax from transferring from the wrapper to the candy.

Accordingly, it is an object of the present invention to provide a laminated foil candy wrapper having satisfactory performance characteristics both in the wrapping operation and in terms of its function as a candy wrapper; and to provide a method of preparing such a laminate.

Other objects and advantages of the invention will be apparent from the following description, the accompanying drawing, and the appended claims.

DESCRIPTION OF THE PREFERRED EMBODIMENTS

Figure 1:
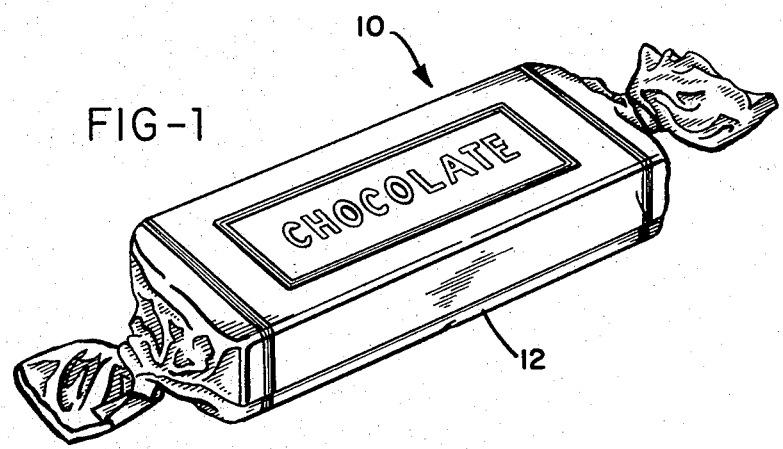
FIG. 1 shows a piece of candy wrapped in the laminated wrapper of the present invention.
Figure 2:
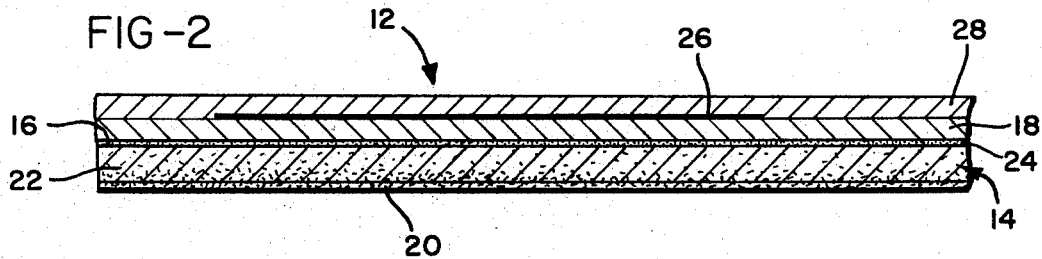
FIG. 2 is a cross-sectional view of the laminated wrapper of the present invention.

Referring to the drawings, which illustrate a preferred embodiment of the invention, there is shown a piece of candy 10 having a wrapper 12. The wrapper consists of a paper base 14 which has been impregnated and coated with a wax. this is accomplished by coating a continuous web of paper with a fortified wax blend in the range of 2 to 5 pounds/ream (3,000 square feet). The fortified wax blend is one which has good release properties and may, for example, be a polyethylene modified paraffin wax. The melted wax coating may be initially applied to the machine finish side of the rawstock, i.e., side 16 of paper base 14, although this is not an essential feature of the present invention. It is this side of the paper base which ultimately is adhered to metal foil 18. The coated paper web is then passed over heated rolls which are held at a temperature considerably above the melting point of the particular wax used (for example, 200°–250°F if the melting point of the wax is 150°F) and then wound up hot (i.e., at 160°–180°F). Before the roll cools appreciably, and usually within 4 hours, it is unwound and passed back through a waxer, which is equipped with chilled rolls. In this operation the hot waxing section assures minimum surface wax by driving the wax completely through the paper web leaving the side 16 on which it was initially coated relatively wax free, the opposite side 20 waxy, and the interior 22 thoroughly impregnated with wax. Preferably the waxy side 20 is the machine glaze side of the paper rawstock, even though this is not absolutely necessary. It has been found that this helps to prevent the candy from sticking to the paper and is a preferred embodiment where release of candy from the wrapper is of primary concern. Other procedures may also be used to obtain a wax impregnated paper base sheet having one waxy surface and one relatively wax free surface. For example, the paper may have wax coated on one side, and the degree of impregnation by the coating is controlled by adjusting the temperature and pressure applied after the coating step.

After waxed sheet 14 has been cooled to room temperature, it is then laminated to a thin metal foil 18. The metal foil may be aluminum or aluminum alloy from 0.00025 - 0.00030 inch thick, although foil up to 0.5 mil may conveniently be used. the backside of the foil is coated with around 1 to 8 pounds per ream of an adhesive, such as butyl rubber modified laminating microcrystalline wax having a melt point within the range of 130°-180°F or amorphous polypropylene adhesive, and the adhesive coated foil and brought into contact with the waxed paper. As previously indicated adhesive layer 24 bonds metal foil 18 to side 16 of paper base 14; however, when the release properties are not critical the foil may be laminated to side 20. During this laminating operation foil 18 is also gravure printed with the desired multicolor decorations and indicia 26. Any conventional rotogravure ink system may be used. Over printing 26 there is applied an overprint lacquer 28.

The laminate is then dampened with an aqueous plasticizing solution, preferably a water-silicone solution, although, other aqueous plasticizing solutions, such as a water-polyethylene glycol mixture, could be used. The amount of solution applied is in the range of between 1 and 3 lbs/ream (3,000 square feet). The dampening may be done by passing the laminate over, but not in contact with, a rotating brush which by centrifugal force throws the solution into the atmosphere surrounding the laminate. The aqueous solution can also be applied by other spraying techniques, such as by use of atomizer-type nozzles, or by a rotogravure application.

After the dampening process, the laminate is wound into a roll and the roll sealed with polyethylene or another relatively moisture-proof material. The rolled laminate is then aged at least eight hours, and preferably from 8 to 24 hours, in order to establish a moisture equilibrium throughout the laminate.

This step is important in imparting the properties to the laminate which make it acceptable for use as a candy wrapper. The dampening and aging steps result in the laminate having a uniform moisture level of approximately 1-3 lbs/ream. This is sufficient moisture to provide good twisting properties. That is, the aqueous solution softens and plasticizes the laminate preventing the foil from rupturing, delaminating and the paper tearing during the wrapping operation. In addition, the silicone gives waxed side 20 of paper 14 better release properties and prevents the candy from sticking to the wrapper or the wax sticking to the candy.

The foregoing operations, except for the aging step, can be carried on in one continuous operation. However, it is preferred that the waxing steps be performed separately from the laminating, printing and dampening operations. This is due to the fact that in the preferred embodiment several steps, including passing the wax coated sheet over both heating and cooling rolls, are necessary to achieve a wax impregnated sheet having one side waxy and the other side wax-free.

EXAMPLE

A 17 pound per ream (3,000 square feet) tissue paper web was coated with 3.5 pounds per ream of a blend of 2 percent polyethylene, sold under the designation Epolene C-17 by Eastman Chemical Products, Inc., and 98 percent of a paraffin wax having a melting point of 150°F. The web is dipped into the hot wax bath and metered off at the nip of the waxer pinch rolls on exit from the bath. After passing over rolls heated to a temperature of 225°F by steam, the coated paper was wound up hot, i.e., 160°-180°F. Within four hours, the coated paper was passed through a waxer over chilled rolls which are cooled to 50°F by circulating a 20°F brine solution through the interior of the rolls. Again the web was wound onto a take-up roll. The coated and impregnated paper was then rewound onto rolls suitable for lamination. It was found to have one side relatively free of wax and the other side relatively waxy.

A thirteen pound per ream aluminum foil was coated on the backside with 3.5 pounds per ream of an adhesive consisting of a blend of 4 percent butyl rubber, sold as Mipol B-30 by Moore & Munger, and 96 percent of a laminating type of micro-crystalline wax having a 150°-160°F melting point. The adhesive coated foil was then laminated to the relatively wax-free side of the waxed paper by passing the joined lamina between the combining nip of pressure rolls.

In line with the laminating press is a rotogravure printing press. The non-adhered side of the foil was printed with multicolors and indicia, using both a dye and standard rotagravure inks. a transparent nitrocellulose lacquer was applied.

The laminate was then treated with an aqueous plasticizing solution by passing it over a rotating brush dampener which sprays the laminate with a solution of 1.5 percent dimethyl polysiloxane, sold by Dow Corning Corp. under the designation Dow Corning 24 Emulsion, in 98.5 percent water. After winding the laminate up on a roll it was wrapped with a polyethylene film and aged at room temperature for 12 hours. After the aging, the laminate was unwrapped, slit into appropriate width rolls of wrapper, and again wrapped with a polyethylene material. The laminate was found to have a moisture level of at least 2 pounds/ream.

A laminated foil wrapper prepared in accordance with this example was used on a modified Forgrove candy twisting machine to wrap individual pieces of candy and it was found to machine well. The freshly wrapped candy was then subjected to high temperature (90°F) and high humidity (75 percent relative humidity) for 7 days. After 7 days, the candy was inspected to be certain that the candy did not stick to the wrapper and also to be certain that the wax on the wrapper did not transfer in any way to the candy. Again the laminated wrapper of the present invention was found to be totally acceptable.

In addition to being useful for wrapping candy, laminates produced in accordance with this inveniton may be used to wrap gum, lozenges, mints, and the like. It should also be apparent that such a laminate is useful for any number of other purposes for which foil, waxed paper, and foil laminates have previously been used.

While the method and article herein described constitute preferred embodiments of the invention, it is to be understood that the invention is not limited to this precise method and article, and that changes may be made therein without departing from the scope of the invention which is defined in the appended claims.

What is claimed is:

1. A method of preparing a laminated foil wrapper comprising the steps of:
    coating and impregnating a continuous paper web with a fortified wax blend,
        said coating and impregnating operations resulting in a wax impreganted paper web one surface of which is waxy and the other surface of which is relatively free of wax, then
    bringing a thin metal foil lamina having an adhesive coated underside into contact with the wax free side of said coated and impregnated paper web in order to form a laminate,
    dampening said laminate with an aqueous plasticizing solution by passing said laminate through an atmosphere laden with said solution,
    winding said dampened laminate into a roll and wrapping said roll in a moisture impervious material, and
    allowing said wrapped roll to age for at least 8 hours until a moisture equilibrium is established throughout the laminate.

2. a laminating method as set forth in claim 1 further including the steps of:
    printing the non-adhered side of said metal foil layer with indicia, and
    coating said printed surface with a transparent overprint lacquer.

3. A laminating method as set forth in claim 1 wherein said coating and impregnating step includes:
    saturating said paper web with a fortified wax blend,
    winding the heated, coated and impregnated web into a roll,
    within a 4 hour period after said winding step, unwinding said coated and impregnated web and passing it over chilled rolls,
    said operations resulting in driving the wax into and through the paper web, leaving the side of the web onto which the wax as initially applied relatively wax free and the opposite side waxy.

4. A laminating method as set forth in claim 3 wherein said fortified wax blend is a polyethylene modified paraffin wax.

5. A laminating method as set forth in claim 1 wherein said thin metal foil is aluminum foil and said adhesive is a butyl rubber modified laminating microcrystalline wax adhesive.

6. A laminating method as set forth in claim 1 wherein said dampening is accomplished by passing said laminate through a moist atmosphere created by a rotating brush which by centrifugal force throws a water-silicone solution into the atmosphere surrounding the laminate.

7. A laminating method as set forth in claim 6 wherein said moisture impervious material is plastic.

8. A laminating method as set forth in claim 7 wherein said dampening and aging steps establish throughout the laminate a moisture level of approximately 1 to 3 pounds per ream.

* * * * *